No. 740,639. PATENTED OCT. 6, 1903.
J. H. FITZGERALD.
BATH TUB TRAP.
APPLICATION FILED AUG. 7, 1902.

NO MODEL.

Witnesses:
H. B. Davis.
M. M. Piper.

Inventor:
John H. Fitzgerald
by Noyes & Harriman
Attys

UNITED STATES PATENT OFFICE.

JOHN H. FITZGERALD, OF BOSTON, MASSACHUSETTS.

BATH-TUB TRAP.

SPECIFICATION forming part of Letters Patent No. 740,639, dated October 6, 1903.

Application filed August 7, 1902. Serial No. 118,697. (No model.)

*To all whom it may concern:*

Be it known that I, JOHN H. FITZGERALD, of Boston, county of Suffolk, State of Massachusetts, have invented an Improvement in Bath-Tub Traps, of which the following description, in connection with the accompanying drawings, is a specification, like characters on the drawings representing like parts.

This invention relates to a form of trap which is especially designed to be used in connection with a bath-tub and to be located between the floor of the bath-room and the ceiling of the room below, and has for its object the provision of means for enabling the ready removal of obstructions in the trap and also the removal of the water therein to prevent freezing.

In some cities the plumbing regulations require that no traps shall be installed in which a metal wall shall be solely relied upon to prevent the passage of sewer-gas to the house, on account of the liability of the formation of blow-holes in the wall when it is cast—that is, the trap must be so formed that in case there is a defective opening in any part of the trap which would permit the passage of sewer-gas into the house the defect will be immediately made known by the leakage of water from the trap.

I accomplish the object above referred to and produce a trap which complies with all plumbing regulations by providing an S-trap of ordinary form with an extension which leads into the leg of the trap next the house side and extends upwardly to the floor-line of the bath-room, thereby forming a chamber access to which may be had from the bath-room and connection between which and the trap is normally closed by a screw-plug at the lower end of said chamber.

For a more definite understanding of my invention reference is made to the accompanying drawings, in which—

Figure 1:
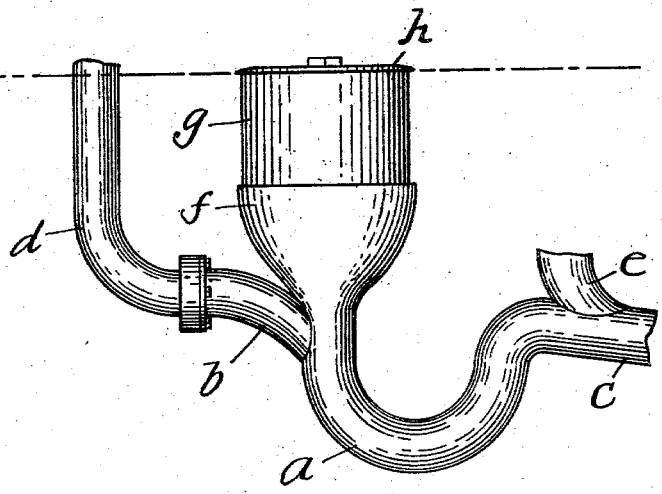
Figure 2:
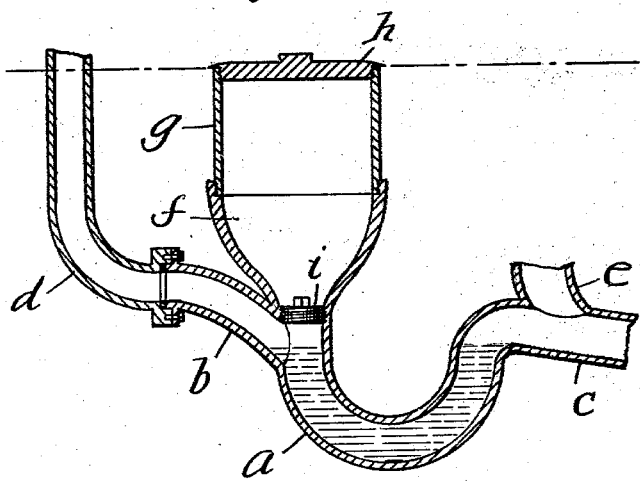

Figure 1 is a side elevation of a trap embodying my improvements, and Fig. 2 is a central cross-section thereof.

An S-trap *a* of ordinary form is provided, said trap being either made of lead or cast in brass and being provided with an inlet-pipe *b* and a discharge-pipe *c*. A pipe *d* connects the inlet *b* with the bath-tub, and the usual ventilating-pipe *e* is provided at the discharge side of the trap.

The leg of the trap on the house side is continued upwardly above the point where the inlet *b* leads into the trap and is enlarged, so as to form a bowl *f*, the latter being screw-threaded at its upper end to receive a tube *g*, which extends to the level of the floor of the bath-room, as indicated, said bowl and tube forming a chamber which is closed on all sides. The upper end of the pipe *g* is closed by a cap *h* of any suitable form.

A screw-plug *i* is threaded into the upwardly-extending portion of the house-side leg of the trap at the lower end of the enlarged portion or bowl *f* and just above the point where the inlet *b* is connected to the trap.

In this trap the scouring or cleaning action by the flow of water is as perfect as in an ordinary S-trap. The plug *i* being located as closely to the inlet *b* as possible prevents the water from backing up into the bowl or chamber *f*, so that its walls would become foul.

In case it is desired to clean the trap or to remove any obstruction or the water therein the cover *h* and plug *i* are removed, enabling easy access to the trap. The chamber formed by the bowl *f* and pipe *g* prevents any possibility of the water in the trap or connected pipes from being spilled when it is removed, so that the ceiling below would be injured, and by having said chamber enlarged access may be had to the trap more easily than if it were no larger than the interior of the trap.

As the screw-plug *i* is above the water seal or level of the water in the trap, there is no danger of the water leaking into the bowl and past the plug. If, however, the chamber above the trap were connected thereto at such a point that it would be necessary to have the plug *i* below the normal water-level in the trap and any such leakage should occur, the water would become stagnant in the chamber above the plug *i* and become so foul in time that the escaping odors therefrom into the bathroom would be highly objectionable.

It will be obvious that a metal wall is not wholly relied on at any point to prevent the passage of sewer-gas into the house and that any defect in any part of the trap which would permit the escape of sewer-gas would be immediately made known by the leaking of water from the trap. This construction, moreover, enables me to use a lead trap instead of a cast-metal one, so that the trap may be bent to a certain extent to enable the connections to be made when the plumbing is installed.

Having thus described my invention, what I claim as new, and desire to secure by Letters Patent, is—

An S-trap having an inlet leading into one side of its house-side leg, the walls of said leg extending above said inlet and diverging to provide an enlarged chamber, and a plug seating in the lower contracted end of said chamber with its lower end substantially on a level with the upper edge of said inlet and providing a passage through the trap of substantially uniform size, substantially as described.

In testimony whereof I have signed my name to this specification in the presence of two subscribing witnesses.

JOHN H. FITZGERALD.

Witnesses:
LOUIS H. HARRIMAN,
M. M. PIPER.